United States Patent [19]

Chopin et al.

[11] Patent Number: 5,718,879
[45] Date of Patent: Feb. 17, 1998

[54] LANTHANUM-STABILIZED ALUMINA PARTICULATES

[75] Inventors: Thierry Chopin, Saint Denis; Jean-Luc Le Loarer, Salindres, both of France

[73] Assignee: Rhone-Poulenc Chimie, Courbevoie Cedex, France

[21] Appl. No.: 692,637

[22] Filed: Aug. 5, 1996

Related U.S. Application Data

[60] Continuation of Ser. No. 336,699, Nov. 7, 1994, abandoned, which is a division of Ser. No. 151,157, Nov. 12, 1993, abandoned.

[30] Foreign Application Priority Data

Nov. 12, 1992 [FR] France ................... 92 13606

[51] Int. Cl.$^6$ ................... C01F 7/02
[52] U.S. Cl. ................... 423/628
[58] Field of Search ............ 502/303; 423/628, 423/265, 275

[56] References Cited

U.S. PATENT DOCUMENTS

| | | | |
|---|---|---|---|
| 4,061,594 | 12/1977 | Michel et al. | 502/303 |
| 4,065,407 | 12/1977 | Bambrick | 423/628 |
| 4,117,105 | 9/1978 | Hertzenberg et al. | 423/628 |
| 4,120,942 | 10/1978 | Spitzer et al. | 423/628 |
| 4,444,899 | 4/1984 | Yamada et al. | 423/628 |
| 4,637,908 | 1/1987 | Weingartner | 423/628 |
| 4,722,920 | 2/1988 | Kimura et al. | 502/439 |
| 4,843,056 | 6/1989 | Matsumoto et al. | 502/303 |
| 4,868,150 | 9/1989 | Spooner et al. | 502/303 |
| 5,063,192 | 11/1991 | Murakami et al. | 502/303 |
| 5,155,085 | 10/1992 | Hamano et al. | 502/439 |

FOREIGN PATENT DOCUMENTS

| | | |
|---|---|---|
| 2596379 | 10/1987 | France |
| 2-083033 | 3/1990 | Japan |
| 1568862 | 6/1980 | United Kingdom |

OTHER PUBLICATIONS

Patent Abstracts of Japan, vol. 10, No. 94 (C-338)(2151) 11 Apr. 1986 & JP-A-60 226 414 (Hitachi Seisakusho K.K.) 11 Nov. 1985.

Patent Abstracts of Japan, vol. 10, No. 107 (C-341)(2164) 22 Apr. 1986 & JP-A-60 238 146 (Hitachi Seisakusho K.K.) 27 Nov. 1985.

*Primary Examiner*—Steven Bos
*Attorney, Agent, or Firm*—Burns, Doane, Swecker & Mathis, L.L.P.

[57] ABSTRACT

Heat-stable alumina particulates well suited as catalysts/catalyst supports, notably for the catalytic conversion of vehicular exhaust gases, contain a stabilizing amount of lanthanum values, optionally a costabilizing amount of neodymium values, and have a specific surface area of greater than 40 m$^2$/g after calcination at 1,200° C. for 4 hours; these are produced by ripening/rehydrating an alumina powder at least partially into boehmite/pseudo-boehmite state in the presence of a stabilizing amount of at least one lanthanum compound, e.g., lanthanum nitrate, and, optionally, also at least one neodymium compound, the starting alumina powder being the product of rapid dehydration of at least one aluminum hydroxide and/or aluminum oxyhydroxide.

15 Claims, No Drawings

LANTHANUM-STABILIZED ALUMINA PARTICULATES

This application is a continuation of application Ser. No. 08/336,699, filed Nov. 7, 1994, now abandoned, which is a divisional of application Ser. No. 08/151/157, filed Nov. 12, 1993, now abandoned.

BACKGROUND OF THE INVENTION

1. Field of the Invention

The present invention relates to a novel alumina particulates comprising stabilizing amounts of lanthanum values, such stabilized particulates retaining a high specific surface area at a high temperature, to a process for the preparation thereof and to the use of such stabilized particulates as a catalyst/catalyst support.

2. Description of the Prior Art

Catalysts comprising an alumina-based support have long been known to this art; they are especially useful for the treatment of the exhaust gases emanating from internal combustion engines.

It is also well known to this art that the efficiency of a catalyst is generally the greater, the higher the surface of contact between the catalyst and the reactants. To achieve this, it is necessary that the catalyst be maintained in as highly divided a state as possible, namely, the solid catalytic particles which constitute the catalyst should be as small and individualized as possible. Accordingly, the fundamental role of the support is to maintain the catalyst particles or crystallites in contact with the reactants in as finely divided a state as possible.

Under the severe conditions to which catalysts for the treatment or conversion of exhaust gases are subjected, their supports, on which precious metal active phases may be deposited, must exhibit excellent heat stability, i.e., must retain a high specific surface area at a high temperature, in particular up to 1,200° C.

The alumina traditionally employed as a support for such catalysts undergoes an irreversible phase transformation to α-alumina under the influence of high temperatures (especially equal to or greater than 1,000° C.), which has the effect of reducing its specific surface area to less than 10 $m^2/g$ and causing sintering of the catalytic phase; accordingly, the catalyst deteriorates and thus loses a large proportion of its efficiency.

It too is known to this art to add to the alumina various compounds for the purpose of improving its heat aging properties. Thus, it is known to impregnate a catalyst support based on preformed and calcined alumina with a rare earth metal nitrate solution (U.S. Pat. No. 4,061,594), or with a solution of a silicon compound. However, the aluminas obtained exhibit a still insufficient specific surface area at a high temperature, and the value of this surface area also decreases very markedly as the duration of the heat treatment increases.

SUMMARY OF THE INVENTION

Accordingly, a major object of the present invention is the provision of novel alumina particulates well suited as support substrates for a wide variety of active catalytic phases, said novel alumina particulates comprising a stabilizing amount of lanthanum values, advantageously homogeneously distributed therethrough, and having a high specific surface area at a high temperature.

Another object of this invention is the provision of a process for the production of such lanthanum-stabilized alumina particulates.

Yet another object of this invention is the provision of improved catalyst/catalyst support substrates comprising said lanthanum-stabilized alumina particulates.

DETAILED DESCRIPTION OF PREFERRED EMBODIMENTS OF THE INVENTION

More particularly according to the present invention, the improved alumina particulates provided hereby contain stabilizing amounts of lanthanum values.

Preferably, the lanthanum is present in the form of an oxide in the alumina.

The lanthanum content of the stabilized alumina according to the invention, expressed as weight of lanthanum oxide relative to the stabilized alumina, advantageously ranges from 1.5% to 15%, preferably from 2.5% to 11%, and more preferably from 3.0% to 7.5%.

After calcination at 1,200° C. for 4 hours (in an ambient atmosphere), the alumina according to the invention exhibits a specific surface area (measured by the B.E.T. technique) greater than 40 $m^2/g$ (for example ranging from 45 to 75 $m^2/g$), preferably greater than 45 $m^2/g$ (for examples ranging from 45 to 65 $m^2/g$), and more preferably greater than 50 $m^2/g$ (for example ranging from 50 to 60 $m^2/g$).

Advantageously, the alumina according to the invention has a specific surface area whose value measured (by the B.E.T. technique) after calcination at 1,200° C. for 24 hours (in an ambient atmosphere) is, in general, still equal to more than 50%, preferably to more than 55%, and more preferably to more than 60% of the value measured (by the B.E.T. method) after calcination at 1,200° C. for 4 hours (in an ambient atmosphere).

Thus, the alumina according to the invention exhibits very good heat stability.

In one embodiment of the present invention, the lanthanum-stabilized alumina particulates also contain neodymium values.

The neodymium in this instance is preferably distributed homogeneously in the alumina and is typically present therein in the form of an oxide.

The amount of neodymium thus present in the stabilized alumina according to the invention, expressed as weight of neodymium oxide relative to the weight of lanthanum oxide, advantageously ranges from 8% to 40%, for example from 12% to 30%.

The present invention also features a process for the preparation of the alumina described above, the stabilizing agent being incorporated therein during a very specific stage in the process.

Thus, the subject process comprises the preparation of said lanthanum-stabilized alumina, from an alumina powder produced by rapid dehydration of an aluminum hydroxide or oxyhydroxide, and wherein said powder is subjected to a ripening operation in the presence of at least one stabilizing agent comprising at least one lanthanum compound (optionally mixed with a neodymium compound), followed by a heat treatment.

The ripening operation, also referred to as a maturing or aging operation, entails rehydrating the alumina powder employed, with the so-called boehmite crystalline phase developing. This rehydration is a dissolution/reprecipitation process. It preferably is carried out by suspending the alumina powder in water at a concentration which advantageously ranges from 50 to 600 g/l, for example from 200 to 350 g/l.

One of the principal characteristics of the process according to the invention is that such rehydration is carried out in the presence of at least one stabilizing agent comprising a lanthanum compound, optionally mixed with a neodymium compound.

Exemplary such lanthanum compounds include the lanthanum salts, especially a lanthanum chloride, nitrate and/or acetate, in aqueous solution.

Lanthanum nitrate is the preferred.

The amount of lanthanum compound added is such that it corresponds to an amount advantageously ranging from 1.5% to 15%, preferably from 2.5% to 11%, and more preferably from 3.5% to 7.5%, by weight of lanthanum oxide relative to the total weight of the stabilized alumina final product.

Exemplary neodymium compounds include the neodymium salts, especially a neodymium chloride, nitrate and/or acetate, in aqueous solution; neodymium nitrate is preferred.

A mixture of lanthanum and neodymium salts in aqueous solution may be used.

The amount of neodymium compound added is such that it corresponds to an amount which in general ranges from 8% to 40%, for example from 12% to 30%, expressed as weight of neodymium oxide relative to the weight of lanthanum oxide.

After introduction of the stabilizing agent, the pH of the suspension is adjusted to a value which preferably ranges from 8 to 12, for example from 9 to 11, by addition of any desired base, generally a weak base, for example ammonia.

The ripening operation is carried out at a temperature which advantageously ranges from 70° to 110° C., preferably about 100° C. (for example from 95° to 100° C.).

The ripening time typically ranges from 1 to 48 hours. When the ripening operation is carried out at a temperature not exceeding 100° C., its duration, for example, ranges from 10 to 48 hours, preferably from 20 to 30 hours. When it is carried out at a temperature above 100° C., an autoclave is generally used and the duration of ripening can then merely range from 1 to 6 hours, preferably from 1 to 4 hours.

The alumina produced is at least partially in the form of boehmite (or pseudo-boehmite); thus, its boehmite (or pseudo-boehmite) content typically ranges from 5% to 35% by weight, preferably from 10% to 30% by weight.

This alumina is subsequently separated off by any known technique for liquid/solid separation, for example by filtration.

The liquid/solid separation operation can, if necessary, comprise a purification treatment which permits efficient removal of the sodium hydroxide (which may be present in the alumina starting powder) and/or of other impurities, especially impurities which may originate from the stabilizing agent employed.

It is thus possible to prepare a stabilized alumina which has a high degree of purity, directly from products containing impurities for the envisaged application, which is generally not the case in the prior art techniques for stabilizing alumina.

The heat treatment is advantageously carried out at a temperature of from 100° C. to 700° C. for a sufficient period of time to remove the water which is not bonded chemically to the alumina, for example from 2 to 32 hours.

This heat treatment can include a drying step, optionally followed by a calcination.

The drying is carried out at a temperature which generally ranges from 100° C. to 250° C., preferably from 100° to 200° C., for a period of time which typically ranges from 2 to 24 hours.

The calcination is carried out at a temperature which generally ranges from 250° C. to 700° C., preferably from 350° to 600° C., for a period of time which typically ranges from 1 to 8 hours.

The alumina starting powder employed in the process of the invention is produced by rapid dehydration of at least one aluminum hydroxide such as bayerite, hydrargillite or gibbsite, nordstrandite and/or at least one aluminum oxyhydroxide such as boehmite and diaspore.

Such dehydration is carried out in any appropriate apparatus, with the aid of a stream of hot gases which permits removing and very rapidly sweeping away the evaporated water. The inlet temperature of said gases into the apparatus generally ranges from 400° to 1,200° C., approximately, for example from 800° to 1,200° C., approximately, with the time of contact between the hydroxide (or oxyhydroxide) and the hot gases usually being on the order of from a fraction of a second to 4 or 5 seconds.

The alumina produced by this dehydration can optionally be treated to remove at least a part of the alkalis present.

The specific surface area, measured by the B.E.T. method, of the alumina produced by rapid dehydration of aluminum hydroxide(s) and/or oxyhydroxide(s) generally ranges from about 50 to 450 m$^2$/g and the diameter of the particles usually ranges from 0.1 to 300 µm, preferably from 1 to 120 µm.

This alumina most commonly has a pore volume on the order of 0.10 to 0.50 cm$^3$/g, the pores generally having dimensions of less than 50 nm.

In one embodiment of the invention, the starting alumina is produced via the rapid dehydration of the Bayer hydrate (hydrargillite), which is a readily commercially available and very inexpensive industrial aluminum hydroxide. Such alumina is well known to this art and is, in particular, described in French Patent No. 1,108,011.

The process according to the invention thus provides an alumina which has excellent heat stability, namely, which retains a high specific surface area at a high temperature; its specific surface area (measured by the B.E.T. method) after calcination at 1,200° C. for 4 hours (in an ambient atmosphere), is greater than 40 m$^2$/g (for example ranging from 40 to 75 m$^2$/g), preferably greater than 45 m$^2$/g (for example ranging from 45 to 65 m$^2$/g and, more preferably still, greater than 50 m$^2$/g (for example ranging from 50 and 60 m$^2$/g).

Advantageously, the process according to the invention provides an alumina which, furthermore, has a specific surface area, measured (by the B.E.T. method) after calcination at 1,200° C. for 24 hours (in an ambient atmosphere), that remains equal to more than 50%, preferably to more than 55%, and still more preferably, to more than 60% of the value measured (by the B.E.T. method) after calcination at 1,200° C. for 4 hours (in an ambient atmosphere); this is not the case as regards aluminas doped by impregnation with a solution of a rare earth metal salt.

The alumina according to the invention thus has a heat stability which is superior to that of the aluminas doped by impregnation with a solution of a rare earth metal salt.

The lanthanum is advantageously distributed homogeneously in the alumina, in which it is preferably present in the from of an oxide thereof.

The stabilized alumina according to the present invention can be employed as a catalyst support. It is especially useful as a support for a catalyst for the treatment of the exhaust gases emanating from internal combustion engines. It can be employed either in the form of beads or in the form of a porous coating layer ("washcoat"), which is deposited onto a monolithic ceramic or metal support; the active phase of the catalyst typically includes precious metals. In particular, the active phase described in U.S. Pat. No. 4,378,307 is exemplary.

The stabilized alumina according to the invention can also be used as a catalyst, especially as a hydrocarbon conversion catalyst. It is, for example, a useful FCC (fluidized bed catalytic cracking) catalyst.

In order to further illustrate the present invention and the advantages thereof, the following specific examples are given, it being understood that same are intended only as illustrative and in nowise limitative.

EXAMPLE 1 (Comparative)

The starting material was an alumina powder of specific surface area of about 390 m$^2$/g, produced by rapid dehydration of hydrargillite.

This alumina powder was impregnated with 5% by weight of lanthanum oxide with an aqueous lanthanum nitrate solution and then dried at 120° C. for 12 hours.

The alumina thus obtained had a specific surface area of 35 m$^2$/g after calcination at 1,200° C. for 4 hours (in an ambient atmosphere) and a specific surface area of only 10 m$^2$/g after calcination at 1,200° C. for 24 hours (in an ambient atmosphere).

EXAMPLE 2 (According to the invention)

The same starting material as in Example 1 was employed.

This alumina power was ripened, namely, rehydrated, by suspending it in water at a concentration of 250 g/l for 24 hours at 98° C., an aqueous lanthanum nitrate solution having been added at the beginning of the operation in an amount which corresponded to an amount of 5% of lanthanum, expressed as weight of lanthanum oxide relative to the total weight of the stabilized alumina final product. The pH was adjusted to about 10 by adding ammonia at the start of the operation.

At the end of the treatment, a liquid/solid separation was performed and the alumina was then dried at 120° C. for 12 hours.

The alumina thus obtained had a specific surface area of 52 m$^2$/g after calcination at 1,200° C. for 4 hours (in an ambient atmosphere) and a specific surface area of 28 m$^2$/g after calcination at 1,200° C. for 24 hours (in an ambient atmosphere).

EXAMPLE 3 (According to the invention)

The procedure of Example 2, was repeated, the only difference being that the amount of aqueous lanthanum nitrate solution added was such that it corresponded to an amount of 10% of lanthanum, expressed as weight of lanthanum oxide relative to the total weight of the stabilized alumina final product.

The alumina obtained had a specific surface area of 47 m$^2$/g after calcination at 1,200° C. for 4 hours (in an ambient atmosphere) and a specific surface area of 26 m$^2$/g after calcination at 1,200° C. for 24 hours (in an ambient atmosphere).

EXAMPLE 4 (According to the invention)

The procedure of Example 2 was repeated, the only difference being that the starting material used was an alumina powder which had been produced by rapid dehydration of hydrargillite, having a specific surface area of about 360 m$^2$/g.

The alumina obtained had a specific surface area of 46 m$^2$/g after calcination at 1,200° C. for 4 hours (in an ambient atmosphere) and a specific surface area of 25 m$^2$/g after calcination at 1,200° C. for 24 hours (in an ambient atmosphere).

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the production of lanthanum-stabilized alumina particulates which comprises ripening a starting alumina powder by suspending the powder in an aqueous solution, said solution comprising a heat-stabilizing amount of at least one lanthanum compound and possessing a pH of 8 to 12, to produce lanthanum-stabilized alumina particulates having a heat-stabilizing amount of lanthanum values and a specific surface area of greater than 40 m$^2$/g after calcination at 1,200° C. for 4 hours, said starting alumina powder comprising the product of rapid dehydration of at least one aluminum hydroxide, oxyhydroxide or mixture thereof.

2. The process as defined by claim 1, comprising thermally treating said lanthanum-stabilized alumina powder.

3. The process as defined by claim 2, comprising heating said lanthanum-stabilized alumina powder and removing unbound water therefrom.

4. The process as defined by claim 3, comprising drying and calcining said alumina powder.

5. The process as defined by claim 4, comprising drying at a temperature of from 100° to 250° C. for from 2 to 24 hours, and calcining at a temperature of from 250° to 700° C. for from 1 to 8 hours.

6. The process as defined by claim 1, said starting alumina powder comprising an aqueous suspension thereof.

7. The process as defined by claim 6, said aqueous suspension comprising from 50 to 600 g/l of said alumina powder.

8. The process as defined by claim 1, said at least one lanthanum compound comprising a lanthanum salt.

9. The process as defined by claim 8, the lanthanum salt comprising lanthanum nitrate.

10. The process as defined by claim 1, wherein said aqueous solution further comprises a costabilizing amount of at least one neodymium compound.

11. The process as defined by claim 10, said at least one neodymium compound comprising a neodymium salt.

12. The process as defined by claim 1, said starting alumina powder comprising the product of rapid dehydration of at least one bayerite, hydrargillite, gibbsite, nordstrandite, boehmite diaspore or mixture thereof.

13. The process as defined by claim 12, said starting alumina powder having a specific surface area ranging from 50 to 450 m$^2$/g a particle size ranging from 0.1 to 300 µm, and a pore volume ranging from 0.10 to 0.50 cm$^3$/g.

14. The process as defined by claim 1, wherein said ripening said starting alumina produces alumina in the boehmite state.

15. The process as defined by claim 1, wherein said ripening said starting alumina produces alumina in the pseudo-boehmite state.

* * * * *